United States Patent
Badenhop (10) Patent No.: US 11,748,778 B2
(45) Date of Patent: *Sep. 5, 2023

(54) MOBILE BILLBOARD SMARTPHONE APP MESSAGING SYSTEM

(71) Applicant: Henry Peter Badenhop, Monroe, NJ (US)

(72) Inventor: Henry Peter Badenhop, Monroe, NJ (US)

(*) Notice: Subject to any disclaimer, the term of this patent is extended or adjusted under 35 U.S.C. 154(b) by 93 days.

This patent is subject to a terminal disclaimer.

(21) Appl. No.: 13/694,729

(22) Filed: Dec. 28, 2012

(65) Prior Publication Data

US 2014/0188614 A1 Jul. 3, 2014

(51) Int. Cl.

| | |
|---|---|
| *G06Q 30/0251* | (2023.01) |
| *H04W 4/021* | (2018.01) |
| *H04W 4/21* | (2018.01) |
| *H04L 67/52* | (2022.01) |
| *H04L 67/53* | (2022.01) |

(52) U.S. Cl.
CPC ......... *G06Q 30/0261* (2013.01); *H04L 67/52* (2022.05); *H04L 67/53* (2022.05); *H04W 4/021* (2013.01); *H04W 4/21* (2018.02)

(58) Field of Classification Search
CPC ........... G06Q 30/0251; G06Q 30/0261; G06Q 30/0267; H04L 67/52; H04L 67/53; H04W 4/021; H04W 4/21
USPC .... 705/14.58, 14.64, 14.66, 14.57; 709/224; 342/463, 450; 370/465
See application file for complete search history.

(56) References Cited

U.S. PATENT DOCUMENTS

| | | | |
|---|---|---|---|
| 6,414,635 B1 * | 7/2002 | Stewart | H04L 67/04 342/463 |
| 8,823,507 B1 * | 9/2014 | Touloumtzis | H04L 67/55 709/224 |
| 2004/0076177 A1 * | 4/2004 | Koch | 370/465 |

(Continued)

FOREIGN PATENT DOCUMENTS

WO WO-2012094465 A2 * 7/2012 ............. G06Q 10/10

OTHER PUBLICATIONS

Google, Location targeting, 2012 (Year: 2012).*

*Primary Examiner* — Tarek Elchanti
(74) *Attorney, Agent, or Firm* — Ernest D. Buff & Associates, LLC; Ernest D. Buff (57) ABSTRACT

A mobile billboard messaging icon displays messages related to a user's preferences from an advertiser on the display of a user's devices, such as Smartphone or tablet, having Internet connectivity, location technology, and logic means for determining when the user device is in a given vicinity of the advertiser's location. The coordinate location of the device is used to identify advertiser's locations within a preselected distance that correlate with user's preferences. Where a correlation is found, at least one message from the advertiser is displayed on the Smartphone or tablet device. The message is triggered when the device enters within the given radii from the advertiser. When triggered, the messaging icon provides relevant real-time promotions, deals and coupons for purchase of goods and services of the advertisers or sponsors related to the user preferences. The mobile billboard displays target messages based on both the user's specific preferences and the user's geographical real-time location.

26 Claims, 7 Drawing Sheets

(56) References Cited

U.S. PATENT DOCUMENTS

| | | | |
|---|---|---|---|
| 2005/0228719 A1* | 10/2005 | Roberts | G06Q 30/0261 |
| | | | 705/14.66 |
| 2006/0036493 A1* | 2/2006 | Aufricht | G06Q 30/02 |
| | | | 705/14.66 |
| 2009/0058720 A1* | 3/2009 | Shaw | H04W 4/029 |
| | | | 342/450 |
| 2012/0323687 A1* | 12/2012 | Schuster | G06Q 30/0261 |
| | | | 705/14.57 |
| 2013/0297416 A1* | 11/2013 | Dipaola | H04W 12/065 |
| | | | 705/14.58 |

\* cited by examiner

MOBILE BILLBOARD SMARTPHONE APP MESSAGING SYSTEM

BACKGROUND OF THE INVENTION

1. Field of the Invention

The present invention relates to Internet messaging systems; and, more particularly, to a mobile billboard messaging icon shown on a display of a Smartphone, tablet or mobile device, or stationary device, having Internet connectivity and GPS technology.

2. Description of the Prior Art

Advertising revenue has become a driving business force in today's business market. Electronic devices have been increasingly employed in the advertising forum, including advertising on computers and mobile devices, such as Smartphones and tablets. The vast majority of advertising platforms and models utilizing such devices randomly provide advertisements with web page links, email links, and contemporaneously with mobile applications and games, or via spam in email. Other advertising platforms utilize tracking algorithms or phishing methods to track consumer's web site searches and visits to attempt to provide advertising geared toward the consumer. Discussions generally concerning these phishing type methods are generally found in the following articles: "In the Age of the Smartphone, Ads Go Mobile" found at http://bits.blogs.nytimes.com/2012/03/07/the-beginning-of-an-era-as-social-ads-go-mobile/ which discusses tracking user's web site visits for targeting advertisements; "Smartphone Advertising: Proof that Businesses Should Do More with their Mobile Strategy" found at http://yourwebsitemarketingservice.com/smartphone-advertising/ which discusses Smartphone advertising as the most successful way for businesses to advertise a message in this on-the-go, short-attention-spanned-society that demands instant gratification and real-time information; "Location & Mobile Advertising" found at http://www.sayitsocial.com/location-mobile-advertising/ discussing criticality of location based, and mobile (Smartphone) advertising for marketing online business, including digital advertising under trade names Google AdMob, Apple iAd mobile advertising network, location based advertising on Foursquare, Gowalla, Facebook and advertising platforms.

Examples of advertising platforms utilizing phishing for advertisements for mobile devices are provided herein below.

U.S. Pat. No. 6,128,651 to Cezar discloses a non-scrolling ad display lodged in a website. Browsers hitting the website are caused to undertake centrally controlled and recorded ad display for guaranteed minimum timed intervals. The system enables precise controlled advertising to each web page viewing browser and accurate advertising budgeting and programming which can be monitored and upgraded to meet marketing needs. The components participating in the system include a website at a webserver for transmitting a page with code for installing a non-scrolling ad frame. Ad content for the non-scrolling ad frame each have individual timers for timing out, commencing with display at the browser and an Internet address for fetching by the browser.

U.S. Patent Application Publication No. 20100100445 to Flood et al. discloses a method and system for targeting online advertisements including receiving a request for an advertisement from a publisher, wherein the request includes an identifying data uniquely associated with a user. The method includes sending a response to the publisher, wherein the response includes the advertisement and an image URL. The method includes receiving a request for the image identified by the image URL and a unique user cookie from the user. If the identifying data has been previously received, the method includes determining a unique user identifier associated with the user from the identifying data. If the identifying data has not been previously received, the method includes determining the unique user identifier associated with the user from the unique user cookie, and associating the identifying information with the unique user identifier.

U.S. Patent Application Publication No. 20090281849 to Choi discloses exemplary systems and methods for developing a mobile network. Exemplary methods include receiving a request to include a mobile network site in a ranked menu of mobile network sites, including the mobile network site in the ranked menu of mobile network sites, sending the ranked menu of mobile network sites to a mobile communications device, receiving a communication from the mobile communications device indicating that the mobile network site should have a different rank, processing the received communication to update the ranked menu of mobile network sites, and sending the updated ranked menu to the mobile communications device.

U.S. Patent Application Publication Nos. 20080059300 and 20080059285 to Hamoui discloses various techniques for improving the delivery of mobile ads to devices. For example, ads are matched with parameters passed to an ad source and then delivered to a publisher to be included with downloaded content. Ads may be targeted to specific devices as specified by an advertiser. Targeting information may be gathered from the device and from information previously provided to the publisher.

U.S. Pat. No. 8,122,051 to Spring et al. discloses support applications for rich media publishing that identify a source of user referral for a media publishing website. The application includes: storing a referring URL in a cookie variable; retrieving the referring URL from the cookie variable during a registration process to enter the media publishing website; dynamically customizing a home page of the media publishing website according to the referring URL; and adding a distinction between original And current session referrals.

U.S. Pat. Nos. 7,970,944 and 7,490,167 to Pena et al. discloses a system and method for platform and language-independent delivery of page-based content. Content defined in a relatively abstract format is rendered into multiple platform formats in client-side application user interfaces in multiple human languages. The relatively abstract format is a subset of XML and is used to define user interface elements to be displayed on a page. A Model-View-Controller architecture is implemented, comprising a plurality of servlet filters, a servlet pipeline and a plurality of rendering processors for client detection, client tracking, relatively abstract format preprocessing, relatively abstract format processing and validating, and transforming and rendering of the relatively abstract format into multiple platform formats in client-side application user interfaces in multiple human languages. A creation, modification and management tool is also disclosed for creating, modifying and managing platform and language-independent page-based content.

U.S. Pat. No. 7,349,923 to Spring et al. discloses a repository system for media publishing, comprising: a plurality of storage devices configured to store a plurality of media items. Each storage device is configured to store a different type of media item than that of other storage devices in the plurality of storage devices. Metadata information relating to the media items is stored in the plurality of storage devices. The metadata information enables hierarchical organization of the media items so that the media items can be relatively easily accessed, moved, added, and deleted.

U.S. Pat. No. 7,181,468 to Spring et al. discloses a content management system for media publishing, comprising: a plurality of content management tools for managing media contents during a publication process. A publishing pipeline is configured to operate in concert with the plurality of content management tools during the publication process to control development, distribution, and access of the media contents. The publishing pipeline provides a plurality of environments for staged and organized development and publication of the media contents.

U.S. Pat. No. 7,890,576 to Button et al. discloses a technology by which information (an electronic note from a producer) that is available for delivery to a client consumer is only selectively delivered. The selective delivery may be based on metadata associated with the information, client identity data and other criteria, including a location of a client device. The information to selectively deliver may be obtained from an external information source, or generated by a service, such as when the user is near a location of interest. The client may report location changes, such as a rate corresponding to a rate of location change of the client. An information service scale involves any practical number of clients via client state servers and location (of interest) servers. Each client state server is associated with a set of one or more clients, and each location server is associated with a set of one or more regions.

None of the heretofore disclosed and/or utilized systems or methods provides a free standing application that links a user to a remote Internet based database or updated app which provides strictly advertisements according to user set preferences such as male, female, age group, types of products or services needed. Additionally, none of the heretofore disclosed and/or utilized systems or methods provides an application that is capable of providing the advertisements when a mobile devices GPS location is active or non-active providing, where active, the distance of the advertising location from the mobile user GPS location or, where non-active, providing distance based on cellular location via cell towers.

Based on the foregoing, there remains a need for an advertisement means that provides a free standing application operative to link a user to a remote Internet based database that provides advertisements according to user set preferences. Further, there exists a need in the art for an application operative to correlate these user set preferences with advertisers located in a given geographical location with respect to the mobile user's GPS location.

SUMMARY OF THE INVENTION

The present invention provides a free standing application for a mobile device that is capable of linking the user to a remote Internet based database which provides advertisements according to user set preferences. Preferences include, inter alia, male, female, age group, types of products or services needed, as well as the distance of the advertising location from the mobile user GPS location or, where the GPS is non-active, distance is determined by cellular/mobile device location via cell towers.

The mobile billboard messaging icon displays messages targeted to a user's preferences from an advertiser on the display of a user's devices, such as Smartphone or tablet, having Internet and GPS connectivity when the user device is within a preselected vicinity from the advertiser's location. The GPS coordinate location of the device is used to identify advertiser's locations within a preselected distance that correlate with user's preferences. Where a correlation is found, at least one message from the advertiser is displayed on the Smartphone or tablet device. The message is triggered when the device enters within the given radii from the advertiser. When triggered, the messaging icon provides relevant real-time promotions, deals and coupons for purchase of goods and services of the advertisers or sponsors related to the user preferences. The mobile billboard messaging displays target messages based on both the user's specific preferences and the user's geographical real-time location.

The mobile billboard messaging icon system is appointed for use with a device having GPS technology, a display screen and Internet connectivity, and wherein the display screen displays a plurality of applications. The icon system is constructed having a mobile billboard messaging icon associated with software that includes entry of user preferences associated with a user of the device and advertiser or sponsor data. The mobile billboard messaging icon is displayed through the Internet connectivity displaying at least one message related to the user preferences generated from at least one advertiser or sponsor. The mobile billboard messaging icon is operative to establish an Internet connection between the device and the mobile billboard messaging icon software. Meanwhile, the GPS location of the device is provided relevant to a given radial distance from at least one location associated with at least one of the advertisers displaying the message. When the GPS is non-active or in standby, the location of the device is provided based on cellular tower positioning and the determined location is then provided relevant to a given radial distance from at least one location associated with at least one of the advertisers displaying the message. The mobile billboard messaging icon only displays the messages when the GPS location is within the given radii from the advertiser. Thus, the message is triggered when the device enters within the given radii from the advertiser. When triggered, the icon provides relevant real-time promotions, deals and coupons for purchase of goods and services of the advertisers or sponsors based on the user preferences.

The mobile billboard messaging icon is displayed on the touch screen of a Smartphone or a tablet that has Internet connectivity and GPS location identifying features. Activation of the icon is automatically in standby. Its main feature is when the user's device (and, consequently, the user of the mobile device) enters within a given geographical radius from the locus where an advertiser's goods/services are offered for sale the icon is activated. This triggers application logic to check for advertising campaigns such as sales events, deals, promotions, etc. and displays a notification on the Smartphone or tablet if there are any If the advertising campaign provided additional criteria to match, such as targeting a specific gender for example, the application logic also checks that based on the user's profile to see if it further meets the targeted ad campaign's criteria. For example, Rick's Golf Superstore is having a "Buy One-Get One 50%" sale on select men's golf gloves. They create an ad campaign on the app's web component, configuring the ad to target those that are within 3 miles of the store location in Woods, N.J., and only those that are men. When Mike, who has the application running on his Smartphone is within that 3 mile radius of the store, the application logic triggers and finds a match since he's within the radius and he is male. A notification goes out on the phone telling Mike about the deal. If Stephanie was within the same radius, the application logic would also trigger, but the notification would not appear since she doesn't meet the other target criteria of the ad campaign, being she is female. The application keeps its local database within the phone where ad campaigns are stored updated with the latest data by a defined scheduled sync-up (feed sync) with the web application server, rather than real-time communication with the web server everytime the application logic runs. This eliminates outside factors such as dependency on the device having good cellular signal reception to communicate and get the necessary advertising results. For example, if Mr. Jones lives in Motown, N.J., then data downloaded on the phone (via nightly feed) would be all ad campaign deals within the set radius miles from Motown, N.J., let us say for example 20 miles of Motown, N.J. Nightly feed over the app communicates new changes—for example 20 advertisers creating adds—wherein if tomorrow one of the campaigns is completed, the nightly feed updates lists of advertising to contain current active campaigns for the next day, updating same, and removing non-active campaigns. If Mr. Jones travels outside his home radius—when there is a location check the system will say the devise is not within location—then the app will prompt the user, Mr. Jones in this example, to ask if he wants new data correlated with the current location. If Mr. Jones selects "yes", then the app will run a real time pull of the local deals. The real time pull is preferably only necessary when the user, in this case Mr. Jones, move outside the set radius (home radius, or other set radius). For example, if Mr. Jones travels to Philadelphia, Pa., the app will ask the user (Mr. Jones) if he wants to download the Philadelphia, Pa. data. If Mr. Jones selects "yes", the app downloads associated with Philadelphia, Pa. then will appear; conversely, the app will not download advertisements with the new location unless the user selects "yes". The night before, or so, the user may log onto the app and request the nightly feed for the given new location rather than the current/home/set location via the nightly feeds.

The app's web component houses campaign data, billing, etc., which is in communication with the application on the phone—when checking where the mobile device/user is located preferably the app does not communicate real time with app web server. Instead app logic is tied to phone so that only during "feed" of data from the app's web component does the phone/or mobile device communicate with the app system, preferably via a nightly feed. In the event that the mobile device/mobile phone communicates back to the system that it generated 10 adds on a given day, then the app system can charge for the 10 apps and provide or feedback the updated adds in the mobile device's location via logic run. Logic runs efficiently with the phone without being dependent on real-time check in. Upon triggering the icon, the software associated with the icon correlates or matches the user preferences associated with the specific user of the device with advertisements in the locality or within the given vicinity. When at least one match or correlation is determined, the mobile billboard messaging icon notifies the user of the match by displaying at least one message on the display of the device. Alternatively, the mobile billboard messaging icon may also generate an audible sound or vibration (as selected by the user) to alert the user that a message has been generated by the icon, displaying an advertisement or promotional image.

Generally, the app logic includes three separate radius logics:

1) Radius one: is a home location radius (HLR)—the purpose is to know what radius to download on the phone so the user gets all the deals in his/her location—for example, the home location radius may be set at various mile radius from Motown, N.J., for example 40 miles, 30 miles, 20 miles, 10 miles, 5 miles, most preferably i.e. 20 miles out from Motown, N.J.; A person in Motown N.J. would most likely doesn't need the deals for Orange County, Calif., so the phone does not need to fetch that amount of data to store locally.

2) Radius two: is a personal radius (AR)—the personal radius is set relative to the mobile device itself, and may for example be set at 10 miles, 5 miles, 2 miles, or 1 mile. Most preferably the personal radius is set for a two (2) mile radius. The application considers the mobile device itself as a moving radius, rather than a point. Whereupon, stores or deals that are extant within the two mile radius result in an alert to the user. By defining it as a radius rather than a point, it allows the user time to get notified earlier as they are approaching the deal location, rather than when it's a point where the user could already be past the location when the notification occurs;

3) Radius three: advertiser's radius (advertiser's circle) (CR)—set by the advertiser wherein the advertiser can control the display of the ad based on the advertiser's deal local radius in relation to either radius one or radius two. For example, if advertiser Dunkin Donuts® wants to only show the ad within three miles of the local store, then the advertisement/deal will not appear on the app unless the advertiser's radius is reached.

In operation, the system check one examines whether it is satisfying the personal radius, as the personal radius changes while the user and visa vie mobile device travel; the advertiser radius does not change. As the user's personal radius changes through traveling, the app looks for other advertiser circles as it hits.

Criteria and advertising targeting is utilized by the app as the location is factored in and then gets triggered when the three radius have any overlap. The advertiser can selectively hit a target audience and is provided the ability to pull information from the targeted audience/market into a data warehouse. Specifically, the advertiser can obtain that with which he/she is interested from the consumer, empowering the advertiser and optimizing the advertiser's ability to target market to a specific group or demographic. It also empowers the consumer to filter out advertisements. The value of the ads, owing to the fact that they are targeted, increases vastly.

Once a match is generated based on the user's location and user preferences, a message is displayed on the Smartphone or tablet device and the user is presented with the ability to receive coupons, promotional deals, special services, products and the like. The user may dismiss the mobile billboard icon message by selecting "x" or delete or ignore, may "keep" the message, saving it for later, or may select the message to view and utilize immediately. Preferably, for basic service of the app the user may not have to pay a fee for the icon services. However, there may be provided a premium version wherein the user has advanced user features not offered in the basic service app package. For example, with the premium app version, the user may have increased capability to control the ads coming in via increased specifics as to what the user is interested in selected by the user; in premium service the user has the capability to filter out further—only feed out deals/advertisements pertaining to golf, etc. Premium app membership would allow the user the feature of picking and choosing which ads appear. Preferably, advertisers or sponsors contract for use of the mobile billboard icon messaging system by subscribing to a website associated with the billboard icon messaging system. Advertisers can design or control content of the icon that is displayed on the smartphone of the user. Alternatively, the icon can link directly to the advertiser's web site for the promotional images and/or messages.

BRIEF DESCRIPTION OF THE DRAWINGS

The invention will be more fully understood and further advantages will become apparent when reference is had to the following detailed description of the preferred embodiments of the invention and the accompanying drawing, in which.

DETAILED DESCRIPTION OF THE INVENTION

This invention relates to a mobile billboard messaging icon that displays messages targeted to a user's preferences from an advertiser on the display of a user's devices, such as Smartphone or tablet, having Internet and GPS connectivity when the user device is within a preselected vicinity from the advertiser's location. The GPS coordinate location of the device is used to identify advertiser's locations within a preselected distance that correlate with user's preferences. Where a correlation is found, at least one message from the advertiser is displayed on the Smartphone or tablet device. The message is triggered when the device enters within the given radii from the advertiser. Upon being triggered, the messaging icon provides relevant real-time promotions, deals and coupons for purchase of goods and services of the advertisers or sponsors related to the user preferences. The mobile billboard messaging icon displays target messages based on both the user's specific preferences and the user's geographical real-time location.

Uniquely, the system displays an advertisement on the display screen of a Smartphone or tablet device of a user; this advertisement is specific to the user's likes, interests, and/or hobbies—as well as the real-time geographical position of the device and, consequently, the user. A free standing mobile billboard application is provided, which directs advertisements to a user on a mobile smart phone or tablet so that the advertisements are specifically directed toward the individual phone user. The mobile app requires the user to enter preference data including gender, age group, types of products or services interested and desired distance from the mobile smartphone or tablet to the advertiser location. The distance from the mobile Smartphone or tablet is determined by the GPS facility present within the mobile device. The mobile billboard app connects the user to a remote database present in the Internet that has an accumulation of current advertisements and coupons. A filter present in the remote database only provides advertisements in the Smartphone that meet the preferences of the user. In a preferred embodiment, each time the user clicks the mobile device app the preferences page is presented. The user may add a new desired item or select a previously provided item; and only the advertisements that relate to the particular item will be presented in the Smartphone.

The mobile billboard Internet messaging system provides a message icon displayed on a Smartphone, a tablet or a mobile device, or stationary computer device, having a display screen and Internet connectivity. Advantageously, the mobile billboard smart phone application of the present invention empowers advertisers, either directly or indirectly (through advertising agencies); to deliver advertisements to potential customers through targeted advertising notifications on the customers' Smartphones. The mobile billboard application attracts and excites a diverse audience of smart phone users or mobile devices with a mobile application that allows them to receive notifications and alerts on discounts, promotions, and savings specific to their hobbies, interests, likes, and/or selections. Uniquely, the subject mobile billboard application allows advertisers to create and run their own ad campaigns using their web browser. A data warehouse is established with a robust reporting tool that captures vital usage data. The usage data thereby obtained can benefit advertisers that are analyzing general customer habits and buying behavior to create more effective ad campaigns.

Customer installation of the mobile billboard application is readily achieved through use of an easy usable interface, including location based notification and alerts. Ad data is capable of real-time, continuous update to ensure ad data is always up-to-date. Incorporation of multimedia applications such as HTML5, video, Flash, and the like is provided for use with the subject mobile billboard. An application referral program may also be provided. Members/customers can further be kept informed of the mobile billboard application features by way of an opt-in email newsletter tool, automatic pop-up tools, and the like, which can further be tailored for specific mobile billboard territories. Links to social media networking sites such as those under the trade names Facebook, Twitter pages, and the like, are also provided through the mobile billboard smart phone/mobile device application.

The mobile billboard application provides a web portal for advertisers, wherein an easy to use interface supports multiple ad campaigns (various advertiser accounts). Simultaneous add campaigns within the same advertiser account are also supported by the systems platform. Agency-managed ad campaigns, including multiple ad campaigns within multiple advertiser accounts managed within each ad agency account, are readily supported by the mobile billboard platform. Each customer's account information is protected in a secured environment to ensure confidentiality of personal information. An administrative level account management feature is integrated within the application's platform to allow mobile billboard account managers to effectively market the mobile application to clients by providing custom offerings and promotions, and the ability to track advertiser account payment status. Further, an advertising cost charging model is provided that supports pay-per-click and ad placement bidding, discount/coupon distribution via barcodes. Multimedia applications, such as HTML5, video, Flash, and the like, are further utilized by the mobile billboard application.

A reporting tool is provided through the mobile billboard application for providing reports to advertisers through an easy to use interface. The reporting tool captures and stores all fields in the data warehouse to allow robust reporting and the ability to create ad hoc reports to allow advertisers to create their own custom reports. Reports may be automatically generated on scheduled intervals, such as via a given time interval (i.e. day 2), thus allowing advertisers to track the status of their ad campaigns. The ability to create ad campaigns from advertiser's Smartphones may further be provided, as well as links to networking/social networking sites.

A diverse audience is appointed to utilize the subject mobile billboard smart phone/mobile device application. Users of the application include customers/members having the customer installed mobile application downloaded on their mobile device, including Smartphones and mobile tablets with data usage enabled. Users of the application's web portal include advertisers (small business owners, large corporations, professionals, and the like) that manage their own advertising accounts; and advertising agencies creating ad campaigns on behalf of their clients. The mobile billboard's account managers utilize the system to manage advertiser relationships by offering promotions and business package deals; and to manage account receivables and payment status of advertiser accounts.

The mobile billboard icon is displayed on a touch screen of a Smartphone or mobile tablet device having Internet connectivity and GPS location technology features. The mobile billboard icon displays on the screen automatically when the user enters within a given radius from an advertisement location. For example, if the user elects that he/she likes coffee, such as from a specific coffee franchise associated with the trade name STARBUCKS, when the user is in a given radius from a STARBUCKS that has an active ad campaign via the mobile billboard icon the mobile billboard icon will display on the Smartphone notifying the user that a STARBUCKS is in the vicinity, and providing the user with applicable discounts, coupons, or other promotional information. The mobile billboard application may provide an audible sound as well as the visual indicator. The user can have the mobile billboard activate automatically, or the user can elect to manually activate the mobile billboard. Wherein the app notifies the user of the STARBUCKS, the user can then either select or activate the app for more information by touching the icon, or the user can select ignore the app. If the user selects to activate the information to be displayed by the app, the user touches the icon which in turn triggers Internet connectivity between the Smartphone or tablet and a web location with which the mobile billboard icon is associated. Once connected to the web location, the Smartphone or tablet user is presented with information as to location, discounts, promotions, coupons, specials, products and the like.

A notification window pops-up on the user's Smartphone display when the app detects that the user is within a location range where advertisers have active ad campaigns. Within that window, the user has the option to navigate by 1) clicking the notification, 2) saving the notification, or 3) deleting the notification. If the user clicks on the notification, the application icon launches the app screen detailing the content of the advertisement. If the user clicks "keep", the ad is stored or saved in a saved deals queue of the user. If the user wishes to ignore the notification, the user can delete the notification by selecting "X" or the like, removing the ad from view.

Once the user clicks on the notification and the content of the advertisement is downloaded onto the Smartphone, the deals summary is displayed. Preferably, the newest deal is displayed by default. The user then is capable of selecting the desired advertising deal. The user's deal queue via "My Deals" lists all active (non-expired deals) for the user. The user selects settings and preferences, allowing the user to configure his/her preferences—such preferences may include demographic information, preferred stores, hobbies, and the like.

Advertising media for each advertiser/business client are stored on the server of the website hosting the mobile billboard icon messing program. Advertisements may be presented to the user at random time periods, specified (advertiser specified) time intervals, or based on GPS location of the user via the location of the Smartphone or mobile device. The GPS enabled Smartphone or tablet looks for the user's preferences located within a fixed distance, for example 10 miles from the location of the Smartphone or tablet. Specific radii from a given location may be provided based on the location identified by the GPS. Radii may include within a 2 to 30 mile radius; 5 to 20 mile radius; or most preferably a 3 to 5 mile radius.

Generally, the app logic includes three separate radius logics:

1) Radius one: is a home location radius—the purpose is to know what radius to download on the phone so the user gets all the deals in his/her location—for example, the home location radius may be set at various mile radii from Motown, N.J., for example 40 miles, 30 miles, 20 miles, 10 miles, 5 miles, most preferably i.e. 20 miles out from Motown, N.J.;

2) Radius two: is a personal radius—the personal radius is set relative to the mobile device itself, and may for example be set at 10 miles, 5 miles, 2 miles, or 1 mile. Most preferably the personal radius is set for a two (2) mile radius. Whereupon, the existence of a store or deal within the two mile radius triggers an alert to the user;

3) Radius three: advertiser's radius (advertiser's circle; or campaign radius)—set by the advertiser wherein the advertiser can control the display of the add based on the advertiser's deal within a local radius in relation to either radius one or radius two. For example, if advertiser Dunkin Donuts® wants to only show the add within three miles of the local store, then the advertisement/deal will not appear on the app unless the advertiser's radius is reached. Campaign radius 1-5 miles (most preferred) but configurable such that setting it can be changed. Advantageously, the campaign radius or advertiser's radius is particularly good for local businesses.

In operation, the system check one examines whether it is satisfying the personal radius as the personal radius changes while the user and visa vie mobile device travel; the advertiser radius does not change. As the user's personal radius changes through traveling, the app looks for other advertiser circles as it hits.

Criteria and advertising targeting is utilized by the app as the location is factored in and then gets triggered when in the three radius have any overlap. The advertiser can selectively hit a target audience and is provided the ability to pull information from the targeted audience/market into a data warehouse. Specifically, the advertiser can get that with which he/she is interested from the consumer, empowering the advertiser and optimizing the advertiser's ability to target market to a specific group or demographic. It also empowers the consumer to filter out advertisements. The value of the ads, because they are targeted, increases significantly. Upon intersection of the three radii, the mobile app alerts the user. This distance can be modified through selection of the user. Advertisement of particular interest may be selected using the preference menu of the mobile billboard application's software program or controlling website associated with the mobile billboard icon object. The user/customer may disable the mobile billboard application messaging feature by setting the preferences menu of the app icon software program, or through a website link to the application's icon messaging where the software resides, and likewise may turn the app on anytime.

Businesses that advertise using the mobile billboard messaging icon system optionally pay a fee for the system operator to present the advertisement on the Smartphone, tablet or a mobile device with Internet connectivity. The mobile billboard messaging icon is delivered through the Internet connection. Additional charges may be applied when a user elects to look at a specific presented advertisement. The user of a Smartphone, tablet or stationary computer is not charged for the mobile billboard messaging icon's advertisements. The advertiser or sponsor of the mobile billboard messaging icon advertisement is preferably charged when the user clicks on or selects an icon. Software for implementing the mobile billboard messaging icon system can be preloaded on the Smartphone or tablet, or installed or downloaded as an application after purchase of the Smartphone or tablet for no additional charge.

Smartphones and mobile tablets contemplated herein comprise any of commonly available Smartphones including but not limited to those sold under the trade names iPhone, iPad, HTC Inspire, Freestyle, HD7S, Surround, LG Quantum, Encore, Phoenix, BlackBerry Bold, Torch, Pearl 3G, Curve, Samsung Solstice, Focus, Captivate, Infuse, MOTOROLA ATRIX, FLIPSIDE, Google tablet, and HP Veer 4G.

A user's Smartphone or tablet device generally includes installed software adapted to generate the mobile billboard icon and display same on the display screen of the Smartphone or tablet. An actuating means is provided for actuating the mobile billboard icon through use of a touch sensitive Smartphone or tablet screen. Touching the mobile billboard icon launches the linked web page through Internet connectivity. Software for displaying the mobile billboard icon and matching preferences with GPS location is provided. GPS enabled software is provided in association with the Smartphone or tablet which communicates with the software for providing location of advertisers and user's for correlation of user preferences.

Figure 1:
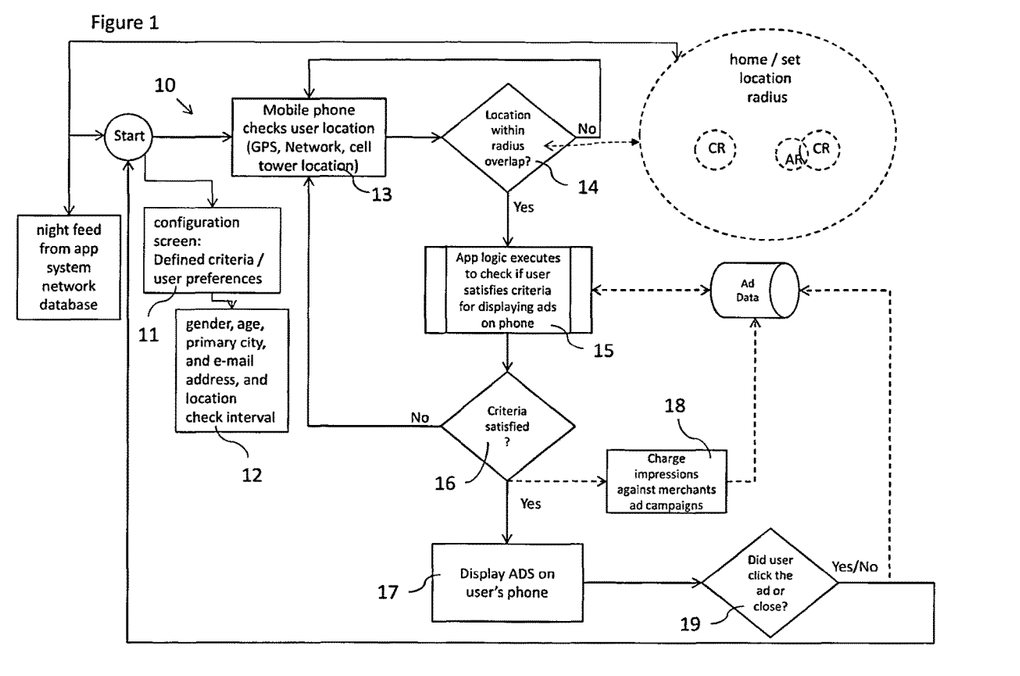
FIG. 1 illustrates a flow chart schematic of the mobile billboard message icon application system of the subject invention.

FIG. 1 illustrates a flow chart schematic of the mobile billboard message icon application system of the subject invention, shown generally at 10. The consumer (end-user) downloads and installs the mobile billboard message application onto his/her Smartphone, mobile device or broadband device. After the initial install and when the app is open/launched for the first time, the user is taken to the configuration screen to complete fields that will allow them to receive specific ads that meet their defined criteria as shown at 11. Mandatory fields preferably include gender, age, primary city, and e-mail address, and location check interval as indicated at 12. Primary City—in the UI screen, it will be displayed with the first letter of each word capitalized (i.e. Makati, Trenton, N.Y.), but preferably converted into all lower case when stored in the database. Location Check Interval—how often the app polls the user's current location, for example 10 minutes is preferably the longest time interval that can be selected. Other values preferably include: 8, 5, 3 minutes. Optional fields include Occupation/Profession, Status, Interests, and Favorite Stores/Shops. The user is notified that the more data they enter, the better are their expected results, and that they can always return to the configuration screen to change/update their selections. Notifications are active by default preferably. As the application can be turned off in the iOS version, the mobile billboard icon app screen displays a message to the user that they are not receiving potential discounts and savings because their notifications are off for the mobile billboard icon app. Scenario: User notices that there are no ad alerts from the mobile billboard messaging, so the user clicks the mobile billboard app icon, and the advertising message is displayed. The mobile billboard app executes in the background, polling the user's location based on the Location Check Interval value via GPS, or in cases where the GPS is non-active, by way of cell tower location at 13. After discerning the user's location, the app checks to see whether the location is within 1) home/set location radius, 2) device location radius, and 3) an active ad campaign radius at 14. If it is not in radius, the app sleeps until the next pole; if it is in within radii overlap then the app runs the logic to check if the user satisfies the ad campaign criteria at 15, 16. Upon satisfying the ad campaign criteria, the ad is displayed on the user's phone at 17.

If the logic is satisfied and the user's profile matches an ad campaign criteria, the following events occur: 1) the ad campaign data is updated, charging the impression against the merchant at 18; 2) the notification is sent to the user's phone; and 3) if there are multiple ad campaign conditions that were satisfied, the ad campaign data is also updated for the other merchants and they are charged the ad impression. The notification displayed on the user's phone would indicate multiple ads (discounts/promotions) available. The user receives the notification and if he/she opens an ad to read the details, the app records the open action in the merchant's ad campaign data at 19. Conversely, if he/she did not open the ad (not interested), the app records the "ignore" action in the merchant's ad campaign data. Even if the user is looking at the details of an ad (from a notification), the app continues its function of polling on the next time interval. To avoid app users from feeling that they are being spammed; the mobile billboard app will have a "deals summary" feature that lists the deals of the day. Broadcast and non-location type campaign models that have their "Ad Display Interval" values set to any value other than "One Time" will have their ad listed in the Deals Summary rather than sending individual ad notifications.

Figure 2A:
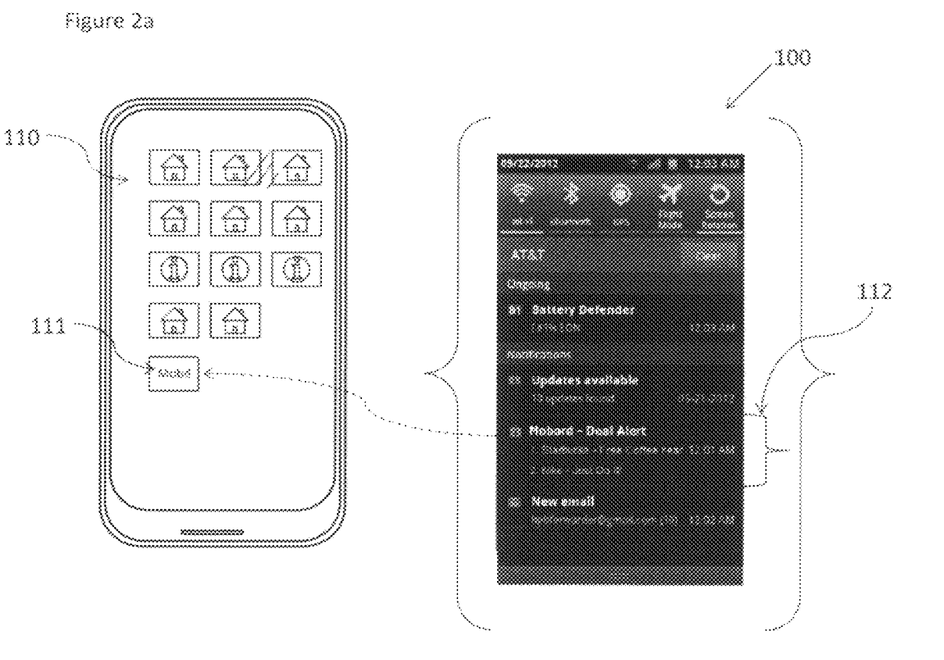
FIG. 2a illustrates a Smartphone with a mobile billboard message icon on the display.
Figure 2B:
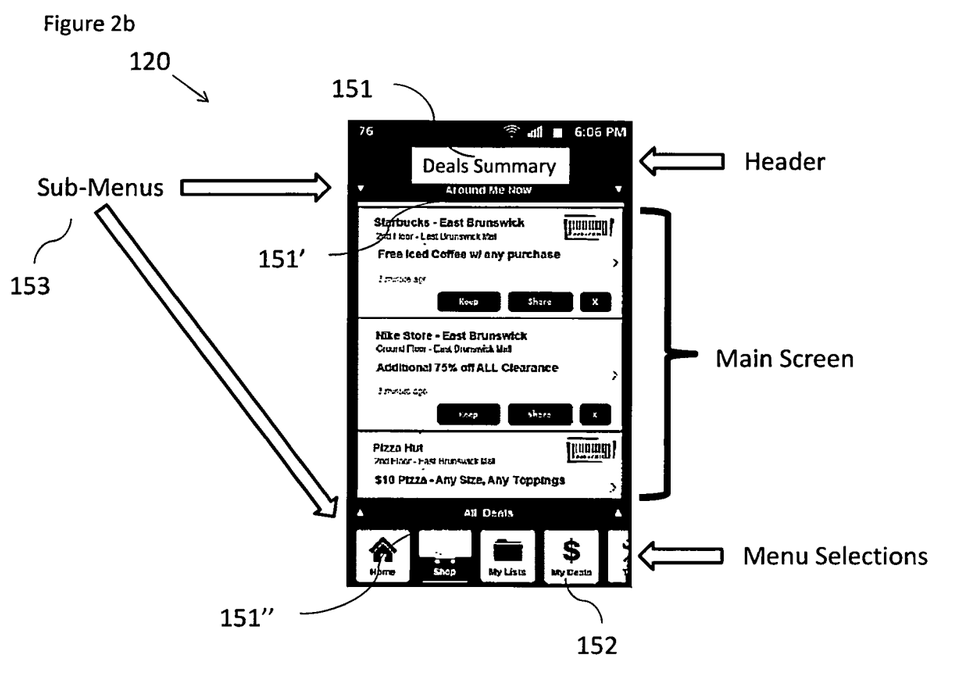
FIG. 2b illustrates an example screenshot on a Smartphone display of the User Interface after executing the app.

FIG. 2a illustrates a Smartphone with a mobile billboard message icon on the display, shown generally at 100. FIG. 2b illustrates an example screenshot showing execution of the mobile billboard message icon, shown generally at 120. A Smartphone 110 is shown with the mobile billboard app icon 111 displayed on the screen. The Smartphone 110 is a mobile broadband device, such as those sold under the trade names IPhone, IPad Android, HTC Smartphone or other Smartphone or PDAs of the type sold by Samsung, Apple, Blackberry or the like. Using the phone's platform, i.e. Android® for example, deal alerts may be presented directly on the display 110 via the phone's built-in notification screen as illustrated at 100. As shown, the mobile billboard application, selection of 112, shows a deal alert. Selection 112 and 111 are points of entry to execute the app. FIG. 2b illustrates an example screenshot showing execution of the mobile billboard message icon, shown generally at 120. Touching the icon 111 selects the feature. In the image shown, the mobile billboard icon app 111 is selected. Upon selection by the user, the user's notifications are displayed as shown at 112 after the app runs the logic to ascertain whether the user satisfies the ad campaign criteria as set forth in regards to FIG. 1; 100 is the notification screen, look and feel will be) different based on operating system (such as those sold under the trade names Android and iphone for example).

Referring to FIG. 2b, screen components include menu selection, providing the main navigation facility of the app. The button selected by the user drives what is displayed in the Main Screen. The user can scroll left to right or right to left to sift through the button choices. The Menu Selections preferably include (from left to right): a) Deals Summary 151; b) My Deals 152; c) Find (not shown); d) Profile (not shown); e) Settings (not shown); and f) Refresh—which provides the user the ability to refresh their Deals list data. Deals Summary 151 provides the "Home" option and displays the Deals Summary screen. When the user selects from the Menu Selections icons, the Main Screen displays the content of that selection. The Header displays the name of the selected menu to allow the user to know which screen is currently active. Sub-Menus 153 provide the user additional choices to browse within their selection. Depending on the selection, there may or may not be sub-menus. As an example, if the Deals Summary icon is selected, Deals Summary 151 has 2 sub-menus→, Around Me Now 151' and All Deals 151". In the user selected Settings, there are no sub-menus displayed. As in the screenshot above, a user picks a sub-menu by dragging the sub-menu header. In the example, Around Me Now is displayed. If they want to see the All Deals list, the user would drag the All Deals sub-menu header up. That would collapse the Around Me Now screen and expand the All Deals screen. The main screen area of the app is where the details are displayed.

Figure 3A:
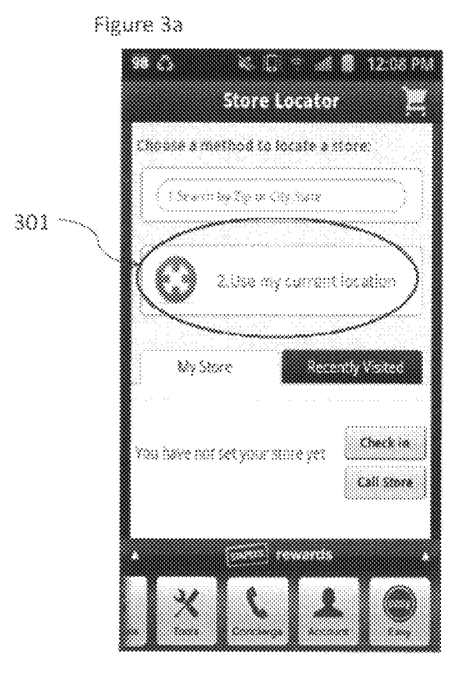
FIG. 3a illustrates an example display screen wherein the user manually opens the app and executes a location query manually.
Figure 3B:
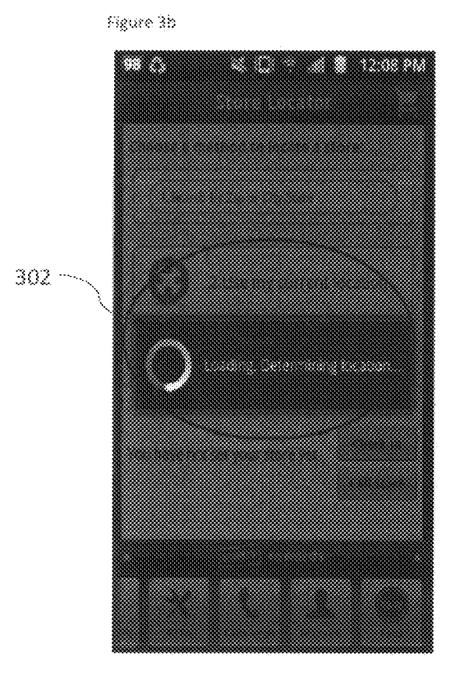
FIG. 3b illustrates the example display screen wherein the user manually opened the app and executed a location query manually, and the icon is searching at the determined location.

FIGS. 3a and 3b illustrate example display screens wherein a user manually opens the app and executes a location query manually initiating a location search at the determined location. The user can manually open the app and execute a location query manually anytime as indicated at 301. Once the location query is activated the app loads the location determination and logic check to determine location and user and ad campaign criteria at 302.

Location is determined by way of GPS, network, or the like, in order to get the current location of the device and, consequently, the user, such as by latitude and longitude location, which is then converted to an address and converted into all lower case letters. The address is saved into a field called "Current Address". City and zip code are extracted from the address field and converted into all lowercase letters. The current city and zip is then saved. Some applications turn off the smart phone's wifi connectivity when the screen is off to avoid issues with the mobile billboard's ability to find the user's location; such issues may be prevalent when the user's GPS is turned off Depending on the type of battery-saving application installed, the wifi, GPS, or cellular network could be turned off. In that event, the mobile billboard app is capable of detecting whether such an application is installed and running on the device. If installed, the mobile billboard app is preferably able to work around the issue by turning ON at least the cellular network to allow it to connect and find the user's location. If it cannot turn on, the screen preferably displays a notification to the user that the mobile billboard app will not work since the battery-saving app is inhibiting it from determining location information. When the user opens the mobile billboard app, the screen also displays this message.

In building the location list table, when merchants are creating ad campaigns, they define the target locations they want to run the ad at. They select from a list of locations that are "near" their search criteria. Preferably the list is continuously updated/built based on profiles of end-users. In the configuration settings of the app, the end-user enters their "Primary City". This value allows us to build a basic list of where the app users are. Since the Primary City can be changed by the end user and is data-entry driven, it is prone to inaccuracies since the value the user entered may not necessarily be their real primary city. Example: If A was just interested in getting deals around where A works, instead of entering A's Home city as his/her Primary City, A would enter his/her work city as his/her Primary City. All the Primary City values are stored in the Location list table. Generation of list locations can also be based on target Locations from "successful" ad campaigns. A merchant can add "New" locations if the ones they want to target are not on the list. These "New" locations are not automatically added to the Location List table. They are only added to the table if the ad campaign generates at least the minimum notifications to add new location value in that target location. For example: Nike wants to run a campaign in Providence, R.I. Providence is currently not on the list of locations, so Nike adds it as a "New" location. When the ad campaign runs, if Nike's ad appears at least 10× within 3 miles of Providence (assume they used the default 3 mile radius criteria), then the system adds Providence to the location list table. If there were 9 notifications and the campaign ends, Providence is not added to the table.

In another embodiment, a route learning algorithm is provided. Since the app continuously queries an end-user's location to determine if they are in range of running ad campaigns, the system preferably uses the queried location information to create a route profile for each user. This doesn't mean the system will store all location information. Each user will typically go through the same routine almost on a regular basis. For example: Home→Stops along the way such school drop-offs, etc→Work→Lunch, errands, etc→Home. By allowing the app to "learn" this common pattern it can build a list of locations that end-users typically go to, which would essentially be the most valuable location values that advertisers/merchants would want.

Figure 4:
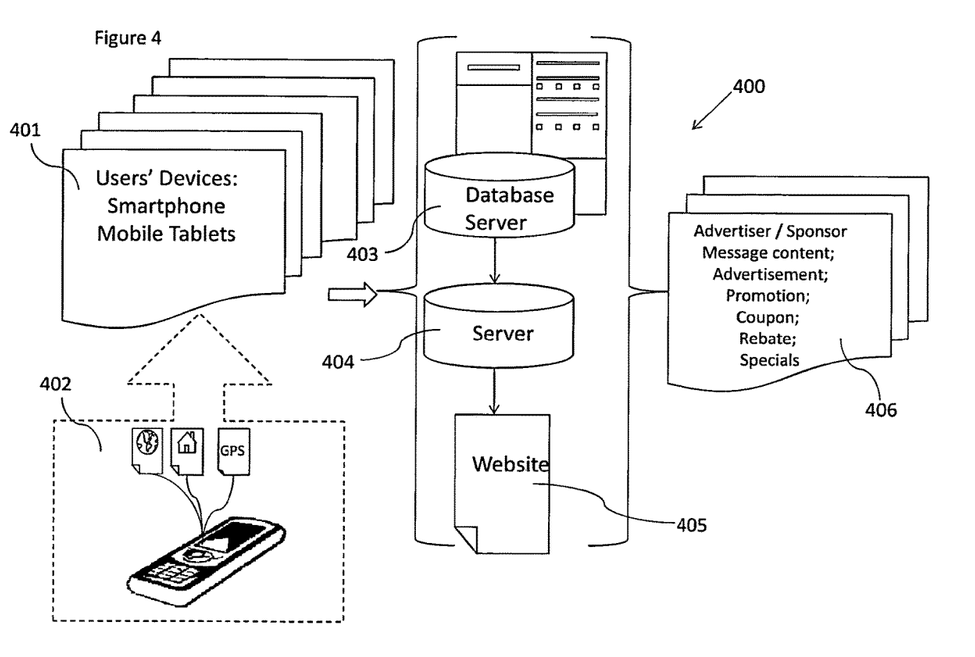
FIG. 4 illustrates the system chart for the mobile billboard message icon system.

FIG. 4 illustrates the system chart of the mobile billboard message icon system, shown generally at 400. A Cloud system chart of the mobile billboard messaging icon system is shown. The users 401 of the system are users of Smartphones 402 having Internet connectivity, or Mobile broadband Wi-Fi connection to access the Internet and provide GPS capability. Cloud computing server 403 is a physical location, website, database resident on the server, and is accessed by the Smartphones that have the mobile billboard messaging icon software. Server 404 controls the application's functionality by performing detailed processing. The database or business rules can be placed in a server 404 which retrieves data to be sent to Smart phone 402 having Internet connectivity. Cloud based applications may be used for delivery of content to the Smartphone. The database server 403, 404 has information of a number of advertising groups and may include promotions, images, advertisements, coupons, rebates, and the like. The information may be stored as a link so that the database servers 403, 404 would store webpage links and pictures appointed for display by the mobile billboard messaging icon. Selection of the mobile billboard messaging icon by the user executes the website 405 initiating the logic query detailed above.

Figure 5A:
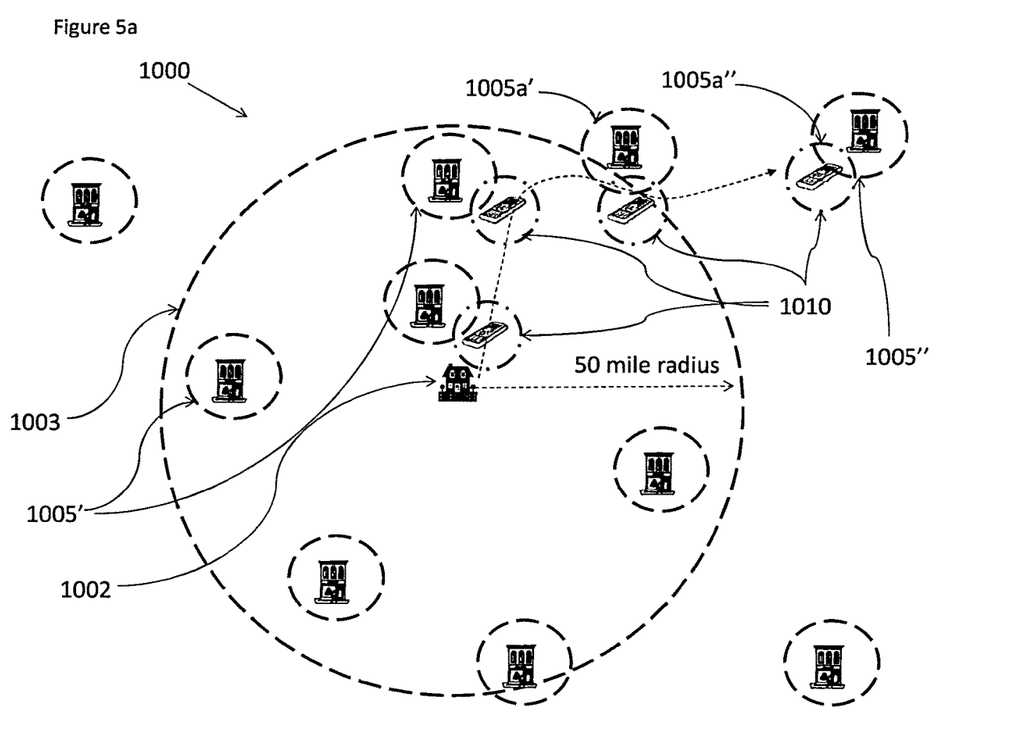
FIG. 5a illustrates an example of the different radius definitions, showing HLR, CR and AR relationships.
Figure 5B:
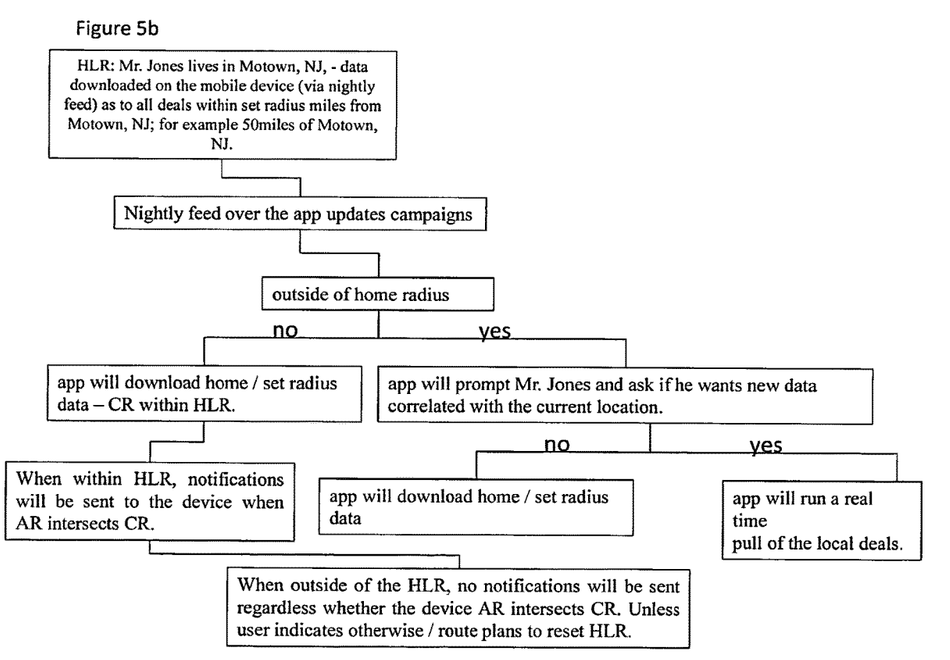
FIG. 5b illustrates how the app's local data is kept updated with the most relevant and current data, as shown in a flow chart.

FIGS. 5*a* and 5*b* illustrate the apps feature and alerts of the system and app, shown generally at 1000. In the profile section of the app the mobile user defines their "Home" location 1002. This is the primary location the app uses to download relevant ads/campaigns within the user's area. The user can enter a zip code or an exact address. Entry of the "Home" location is mandatory. On the average, a typical user will go on their daily activities within proximity of the "Home" location 1002. Someone in, for example, New Jersey, would not likely be interested in a deal in California. To ensure the user only gets those relevant campaigns, the app uses the "Home Location Radius" (HLR) 1003 to retrieve only active campaigns that are within the HLR. The radius is set to be enough to cover a user's typical daily route. For example, the HLR radius may be 50 mile radius, 30 mile radius, or 20 mile radius. The HLR is refreshed daily via a feed from the main application server to ensure the most up-to-date campaign information. Preferably, it mimics the first time the user installs the app on the mobile phone. The user enters his/her zip code, i.e. "08831", as the home location in the profile menu of the app.

Herein, the HLR 1003 is set to 50 miles, indicated by the phantom circle. The app initiates a feed request from the main app server in the cloud to send an advertiser's active campaign that is within the HLR 1003. Each advertiser's campaign defines a "Campaign Radius" (CR) 1005. The CR is the area that the advertiser wants its advertising to be seen. What is downloaded onto the user's phone is based on CR that fall within the HLR, indicated as 1005'. Conversely, CR that does not fall within the HLR is indicated at 1005". CR's that do not fall within the HLR are not included within the user's alerts/are not downloaded. Note that this store's location CR 1005*a*' is outside of the HLR circle, but because the CR 1005*a*' ad campaign's defined radius (phantom small circle) is large enough that it intersects with the HLR, it is considered within the user's HLR and it is thus included in the download onto the user's mobile device.

Advertisers are given great control in terms of how their campaign targets their audience. Control mechanisms include, ad demographic conditions, such as gender (male only; female only), age and/or age groups, marital status (single; married), children status (have children; if so, ages/age ranges of children; gender of children; no children), and/or special interests (sports, hobbies, etc.). Only users who meet the criteria will then get the advertisement from the merchant.

Further, the users have a defined radius "Alert Radius" (AR) 1010. The AR is a smaller radius than the HLR and falls within the HLR. Preferably the AR radius range options 1 mile, 3 miles, 5 miles, and/or 10 miles. Whenever the AR intersects with an active campaign's radius (CR) 1005', it will trigger the notification on the mobile device letting the user know there's a deal/ad nearby. As the user travels, the AR intersects CR within the HLR and the user is alerted as to the deal/ads. Only new ad triggers a notification, even though the user is still in the radius of the other advertiser. The system recognizes that the notification for the other ad was sent recently, so it will not send a duplicate.

Once the phone/mobile device AR 1010 is outside of the HLR there are no notification triggers even if a CR is intersected, as indicated at 1005*a*". This is because the campaign is outside the user's HLR. Essentially, the campaign data is not part of what's synched on the user's mobile device.

Further, the app and system thereof may include a route planning feature that allows the route planning to be done on the mobile device, and/or on the webpage. If for example John Doe is traveling but lives in East Brunswick N.J., Boston would be outside of John Doe's "Home Radius"/HLR, so 50 miles outside of that, John Does wouldn't get the deals. John Doe would go to the website and login with his account information. John Doe selects Route Planning, and is taken to a page almost similar to Google maps, for example, where John Doe enter "From" and "To location". The system would leverage Google maps to do the route and direction mapping. The user, John Doe, would then confirm that that's the route he wants to take. The system would then display all the deals along the route, within X radius of the route. The user can select to load all the deals found along the route on their mobile device, or they can pick and choose which deals they want to load on the phone. Since the trip is still several weeks away for example, the system would prompt the user to schedule the download sometime close to the trip date. The date entered would be the date the system will send the campaigns along the route to the user's phone. There will also be an option for the user to "Get Me More Deals". If selected, the trip route will be made available to advertisers/merchants within the route—anonymously. No user information is passed on to the advertisers. This will tell advertisers of the possible sales lead and can create a campaign to entice the user to stop by during the trip. Additional campaigns could then be created prior to the trip and by the time the route is downloaded to the user's phone, there would be more deals available along the route.

Advantages are rendered through practice of the mobile billboard messaging system of the present invention. These and other advantages include, for example:
1) empowers advertisers, either directly or indirectly (through advertising agencies), to deliver advertisement to potential customers through target advertising notifications on the customers' Smartphones;
2) attracts and excites a diverse audience of smart phone users with a new mobile application that will allow them to receive notifications and alerts on discounts, promotions, and savings specific to their hobbies, likes, and/or selections;
3) advertisers are capable of creating and running their own ad campaigns using their web browser;
4) a data warehouse is established with a robust reporting tool that captures vital usage data that can benefit advertisers when analyzing general customer habits and buying behavior to create more effective ad campaigns;
5) provides users/consumers with real-time promotions based on user's specific interests selected by the user and correlated with the location of the user to increase prospects that the advertisement will result in a sale.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. In combination with a device having location identifying technology, a display screen and Internet connectivity, and wherein said display screen displays a plurality of applications, a mobile billboard messaging icon system comprising:

a) a mobile billboard messaging icon associated with software that provides entry of user preferences associated with a user of said device and advertiser or sponsor data;
b) said mobile billboard messaging icon having Internet connectivity with a web component of said system and being operative with said device for downloading and displaying at least one message related to said user preferences and generated from at least one advertiser or sponsor;
c) said mobile billboard messaging icon being further operative with said device to establish an Internet connection between said device and the mobile billboard messaging icon software for downloading data onto said device, said mobile billboard messaging icon being operative to retrieve downloaded data from said device, wherein said system executes logic means to determine said location of said device relevant to at least one radial distance from at least one location associated with at least one of said advertiser message;
d) said mobile billboard messaging icon only displaying said message on said device when said location is within said given radii from said advertiser;
e) said Internet connection between said device and said mobile billboard messaging icon software being automatic and said location being periodically refreshed;
f) said message being triggered after a preselected period of time upon entry within said given radii from said advertiser or upon an event being activated by said system;
g) said location identifying technology being operative to run on the background of said device, and leverage the device network connection, first checking whether GPS of the device is on and executing same, however if the GPS is off then determining location via cellular location cell tower communication;
h) selection of said mobile billboard messaging icon being operative to establish an Internet connection between said device and said advertiser, thereby scanning said GPS location and providing said message related to said user's preferences within said given radial distance range from said advertiser's location; and
i) said mobile billboard messaging icon being operative to (i) detect whether the device has a battery-saving application for turning off GPS or cellular connectivity, and (ii) display a notification on said display screen that the mobile billboard messaging icon will not work since the battery-saving application is inhibiting determination of location information,
whereby said message is triggered when said device enters within said given radii from said advertiser, and wherein when triggered provides relevant advertisements for purchase of goods and services of said advertisers or sponsors related to said user preferences.

2. The mobile billboard messaging icon system as recited by claim 1, wherein said device is a mobile phone or smartphone.

3. The mobile billboard messaging icon system as recited by claim 1, wherein said device is a mobile tablet.

4. The mobile billboard messaging icon system as recited by claim 1, wherein said device is a computer.

5. The mobile billboard messaging icon system as recited by claim 1, wherein no fee is paid by said user of said device.

6. The mobile billboard messaging icon system as recited by claim 1, wherein a fee is paid by said user of said device for a premium account with said system, wherein said premium account includes advanced functionality associated with said user preferences.

7. The mobile billboard messaging icon system as recited by claim 1, wherein said location identifying technology comprises GPS technology.

8. The mobile billboard messaging icon system as recited by claim 1, wherein said location identifying technology comprises cell tower location technology.

9. The mobile billboard messaging icon system as recited by claim 1, wherein said given radial distance ranges from about 2 miles to 30 mile radius.

10. The mobile billboard messaging icon system as recited by claim 1, wherein said given radial distance ranges from about 5 miles to 20 mile radius.

11. The mobile billboard messaging icon system as recited by claim 1, wherein said given radial distance ranges from about 3 miles to 10 mile radius.

12. The mobile billboard messaging icon system as recited by claim 1, wherein said radius is a home location radius set relative to said user's home location.

13. The mobile billboard messaging icon system as recited by claim 1, wherein said radius is a personal radius set relative to the mobile device itself.

14. The mobile billboard messaging icon system as recited by claim 1, wherein said radius is an advertiser's radius (advertiser's circle; or campaign radius) set by the advertiser wherein the advertiser can control the display of the ad based on the advertiser's deal local radius.

15. The mobile billboard messaging icon system as recited by claim 1, wherein said logic includes three separate radius logics comprising: 1) Radius one: is a home location radius set relative to said user's home location; 2) radius two: a personal radius set relative to the mobile device itself; and 3) radius three: an advertiser's radius (advertiser's circle; or campaign radius) set by the advertiser wherein the advertiser can control the display of the ad based on the advertiser's deal local radius in relation to either radius one or radius two.

16. The mobile billboard messaging icon system as recited by claim 1, wherein said message is an advertisement for goods or services.

17. The mobile billboard messaging icon system as recited by claim 1, wherein said message is a promotional message.

18. The mobile billboard messaging icon system as recited by claim 1, wherein said user preferences comprise gender, age, hobbies, and interests.

19. The mobile billboard messaging icon system as recited by claim 1, wherein said mobile billboard messaging icon system provides an audible alert when said user is within said given radial distance range and said user preferences are matched with said advertiser's location.

20. The mobile billboard messaging icon system as recited by claim 1, wherein said advertiser message comprises promotions, deals and/or coupons.

21. The mobile billboard messaging icon system as recited by claim 1, wherein said location identifying technology provides global positioning location via longitude and latitude.

22. The mobile billboard messaging icon system as recited by claim 1, wherein said Internet connection between said device and said mobile billboard messaging icon software for downloading data onto said device is provided by way of a data feed execution.

23. The mobile billboard messaging icon system as recited by claim 22, wherein said data feed execution is set to automatically take place at least once during a 24 hour period.

24. The mobile billboard messaging icon system as recited by claim 1, wherein said radius is a Home Location Radius based on a user's home location or selected location.

25. The mobile billboard messaging icon system as recited by claim 1 comprising at least one Campaign Radius.

26. The mobile billboard messaging icon system as recited by claim 1 comprising an alert radius based on said mobile device location.

* * * * *